United States Patent [19]

Dieul

[11] Patent Number: 4,824,710
[45] Date of Patent: Apr. 25, 1989

[54] HEAT-INSULATION WALL AND ITS APPLICATION TO THE BUILDING OF A HEAT-INSULATION DEVICE

[75] Inventor: Jean H. L. Dieul, Voisin Le Bretonneux, France

[73] Assignee: Bronzavia Air Equipment, Courbevoie, France

[21] Appl. No.: 27,248

[22] Filed: Mar. 18, 1987

[30] Foreign Application Priority Data

Mar. 21, 1986 [FR] France ................ 86 04105

[51] Int. Cl.⁴ .............................................. B32B 5/12
[52] U.S. Cl. ................................. 428/113; 428/105;
  428/114; 428/280; 428/367; 428/408; 428/920
[58] Field of Search ............. 428/105, 107, 108, 109,
  428/113, 114, 408, 367, 457, 920, 280, 282

[56] References Cited

U.S. PATENT DOCUMENTS

| | | | |
|---|---|---|---|
| 1,771,216 | 10/1925 | Gossler | 156/181 |
| 3,565,740 | 2/1971 | Lazar et al. | 156/181 |
| 3,994,762 | 11/1976 | Wrzesien et al. | 428/300 |
| 4,507,341 | 3/1985 | Heseltine | 428/457 |
| 4,564,377 | 1/1986 | Kocatas | 428/294 |
| 4,686,150 | 8/1987 | Talley et al. | 428/113 |

Primary Examiner—James J. Bell
Attorney, Agent, or Firm—Oblon, Fisher, Spivak, McClelland & Maier

[57] ABSTRACT

The invention pertains to a heat-insulation wall comprising a superimposition of layers of materials which contribute to limiting the transmission of heat.

In the invention, at least one of the said layers of material conducts heat in the directions parallel to the main plane of the wall and retards heat in the directions perpendicular to the said main plane.

Application: heat insulation of structures transmitting temperature which is non-homogeneous on their surface opposite to a heat source.

7 Claims, 3 Drawing Sheets

FIG_1
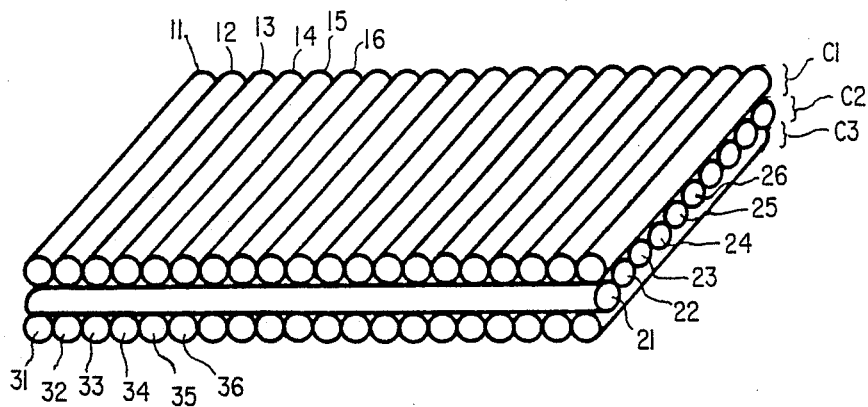
FIG_2
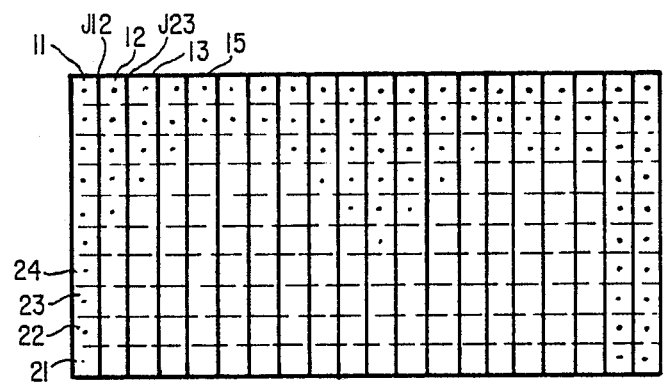
FIG_3
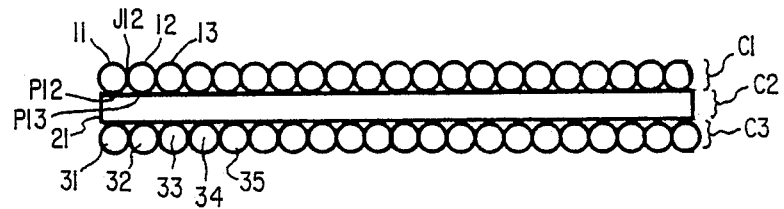

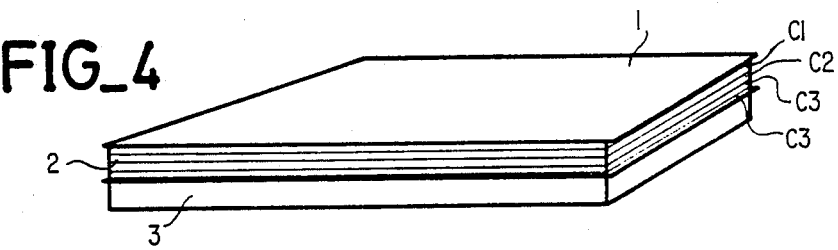
FIG_4
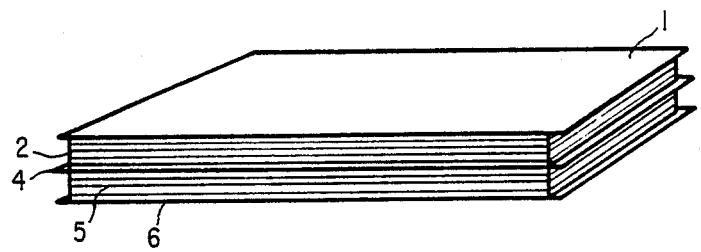
FIG_5
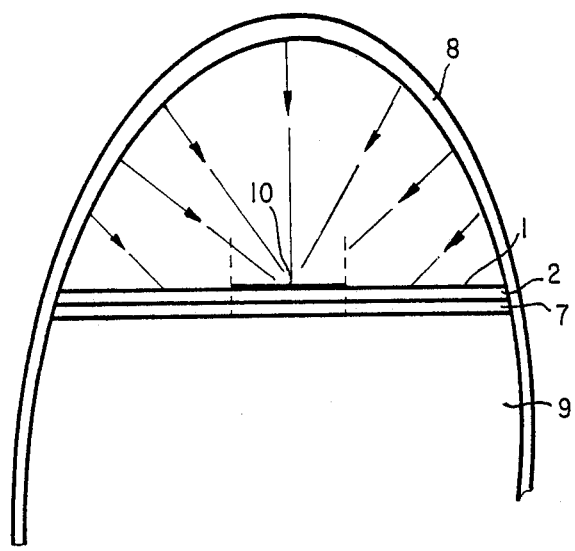
FIG_6

FIG_7
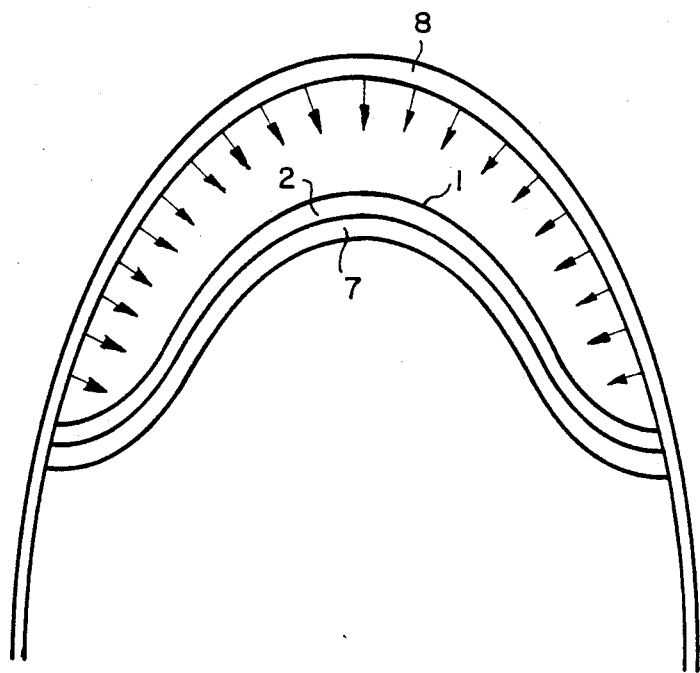

HEAT-INSULATION WALL AND ITS APPLICATION TO THE BUILDING OF A HEAT-INSULATION DEVICE

BACKGROUND OF THE INVENTION

1. Field of the Invention

The invention pertains to a heat-insulation wall comprising at least one layer of material to limit the convection of heat, and to its application to the building of a heat-insulation device such as, for example, a heat shield.

The wall of the invention and the device which can be made with it are intended for use in insulation or heat protection against high temperatures i.e., temperatures of at least 700° C.

Heat-insulation devices, also known as heat shields, are used in many fields, for example, in industry when high temperature heat sources present risks to the environment. Heat shields are also used in aeronautics to insulate the heated parts of a jet engine from the rest of the aircraft and also in space exploration vehicles to protect them when they re-enter the atmosphere.

A heat-insulation device must be reliable and efficient and, when loaded on board a vehicle, it should be as light as possible so that the efficiency of the engine is not affected by its presence and by the additional weight which it entails.

2. Description of the Prior Art

In the prior art, there are heat-insulation devices made of refractory materials which, depending on their densification, block the transmission of calorific radiation in varying degrees. The disadvantage of these devices is that their weight and bulk increase proportionately with their efficiency.

Other devices made of at least one low-density insulating material, in the form of sheets and reflecting screens, generally meet the requisite weight conditions of vehicles but also have disadvantages. It can happen that a part of the surface of the screen is subjected to temperatures that are higher than other parts, and that the screen lets through a certain amount of heat at these higher-temperature parts of its surface while working properly at other places, owing to the temperature gradient which is created in every direction through the material.

In order to improve the efficiency of the devices comprising screens of this type, walls are made in the prior art in which there is a superimposition of reflecting screens and layers of insulating materials. The role of the screens is to reflect the infra-red radiation, and the layers of insulating materials limit the transmission of heat, through convection, beyond the screens. The insulating materials are generally based on mineral or organic wool or on products with similar properties.

However, if the heat emitted locally is excessive, it can happen that the reflecting screen is destroyed and that a layer of convection-insulating material, interposed between this screen and another, is inadequate and ultimately lets through excessive radiation and, consequently, excessive heat. The invention is therefore aimed at providing remedies for these disadvantages by enabling the building of a heat-insulation wall which is light, the insulating possibilities of which are used to the maximum throughout the surface.

SUMMARY OF THE INVENTION

The invention pertains to a heat-insulation wall comprising superimposed layers of materials which contribute to limiting the transmission of heat, a heat-insulation wall wherein at least one of the layers of materials conducts heat in the directions parallel to the main plane of the wall and retards heat in directions perpendicular to the main plane.

According to another characteristic of the invention, the layer of material is close to the surface of the wall facing the heat source.

The structure of this layer of material is especially useful in cases where the temperature received through that surface of the wall which is exposed to the heat source is not homogeneous. This layer of material can be divided into elementary sub-layers, and its efficient conductivity in the planes parallel to the main plane of the wall makes it possible to provide homogeneity to the temperature in each of the sub-layers. Furthermore, in view of the fact that the structure of this layer of material retards heat in the directions perpendicular to the main plane, the temperature of the sub-layers which are farthest away from the heat source is lower than the temperature of those which are closer, for the temperature in the wall decreases evenly as and when the heat flux spreads through it.

Furthermore, as soon as the heat flux encounters the first layer of material, the temperature becomes homogenized throughout the surface of this layer, at a value ranging between the maximum and the minimum temperatures received from the source. Thus, as soon as the heat flux encounters the material, there is a fall in temperature.

One of the main advantages of the invention lies in the fact that, if a conventional insulating material is placed near the surface of the layer where the temperature is homogeneous, the insulating material is simply used to stop the excess heat which has managed to cross the layer, by being subjected to heat homogeneously in every part.

Depending on the ambient conditions to which a wall, made with this type of a layer of material, is subjected, it may be necessary to have several successive layers of the material, separated by suitable screens so as to achieve the right level of homogenization of the temperature.

DESCRIPTION OF THE DRAWINGS

Other characteristics and advantages of the invention will be seen in the following description of some modes of embodiment, made with reference to the appended figures of which:

FIG. 1 is a perspective view of one mode of embodiment of the material which conducts heat in the directions parallel to the main plane of the wall and retards heat in the direction perpendicular to the main plane;

FIG. 2 is a view from the top of the material of FIG. 1;

FIG. 3 is a side view of FIG. 1;

FIG. 4 is a perspective view of an insulating wall made with the material of FIGS. 1 to 3;

FIG. 5 depicts an alternative mode of embodiment of the wall made with the material of FIGS. 1 to 3;

FIGS. 6 and 7 are views of heat-insulation devices incorporating a wall that uses the material which conducts in the directions parallel to its main plane and retards heat in the directions perpendicular to the main plane.

DESCRIPTION OF THE DISCLOSED EMBODIMENTS

FIGS. 1 to 3 depicts views, from various angles, of a possible and preferred mode of embodiment of the material with which it is possible to obtain a homogeneous temperature on one of its surfaces when the other surface is not subjected to a homogeneous temperature.

In the preferred mode of embodiment, this material possesses the structure of a felt material, the thickness of which is small as compared with its other two dimensions. This felt is insulating in its thickness while it is conductive in the planes perpendicular to its thickness.

So that the felt may be capable of providing insulation in some of its planes and of being conductive in others, it is made up of at least two elementary layers, C1, C2, made of conductive material fibers. Efficient conduction is provided among the fibers of one and the same elementary layer, while there is retarding among the fibers of two different elementary layers. For this, the fibers of one and the same elementary layer are in contact, in pairs, at least over a large area so that heat can be transmitted from one fiber to another, while the contact surfaces between the fibers of two different elementary layers are reduced to the minimum so that the transmission of heat is reduced to the greatest possible extent.

In one mode of embodiment, the material represented in FIGS. 1 to 3 comprises three elementary layers, C1, C2, C3 of fibers made of conductive material. Each of the fibers of the various elementary layers has a roughly circular cross-section and can, therefore, be likened to a cylinder. Most of of the fibers of one and the same layer are parallel to one another and in contact with one another along their length, and the fibers of two superimposed elementary layers are, for example, perpendicular to one another in such a way that there is a single point of contact between two fibers of two neighbouring layers.

In FIGS. 1 to 3, it is observed that the fibers 11, 12, 13, 14, 15, 16, etc. of the layer C1 are in contact with one another, in pairs, through the tangential junctions J12, J23, just like the fibers 21, 22, 23, 24, 25, 26, etc. of the layer C2 or the fibers 31, 32, 33, 34, 35, 36 etc. of the layer C3, while the single tangential points P12, P13 appear between two adjacent fibers belonging to two different layers.

FIG. 4 represents a first type of heat-insulation wall which can be made with the material described with reference to FIGS. 1 to 3.

A wall of this type comprises a screen 1, made of a reflecting material, superimposed on a layer 2 made of a material which is highly conductive in the plane parallel to the main plane of the screen and is retardant in the planes perpendicular to the main plane of the screen, this layer 2 being itself superimposed on a layer 3 of insulating material. The reflecting screen 1 is, for example, formed by a sheet of reflecting material or a sheet of a supporting material lined with a reflecting material such as gold, platinum, palladium, beryllium or any other material suited to the range of infra-red frequencies that are to be reflected.

In an alternative embodiment, a screen is formed by a superimposition of different materials, thus enabling a wider spectrum of radiation frequencies to be reflected.

In the example depicted, the layer 2 of material, used to make the temperature homogeneous, is formed of four elementary layers, C1, C2, C3 and C4 made of conductive fibers laid according to the arrangement shown in FIGS. 1 to 3, or according to an arrangement by which the same result can be obtained.

The purpose of the layer 3 of insulating material is to retard the convection beyond the temperature-homogenizing material.

FIG. 5 depicts an alternative mode of embodiment of a wall according to the invention, using a material to homogenize the temperature.

This wall is made by placing screens made of reflecting materials alternately with temperature-homogenizing material. The two end surfaces, 1 and 6, of the wall are screens made of reflecting materials and, in the example, in between these two screens, there are two layers, 2 and 5, of temperature-homogenizing materials separated by another screen 4 made of reflecting material.

This method is more particularly appropriate when the impinging radiation received by the wall is within a range of high frequencies, i.e., when the temperature gradient received by the wall is high.

Other alternative modes of embodiment, not depicted in the figures, are possible.

Thus, it is possible to make a wall in which both the end surfaces are formed by reflecting screens with several layers of conventional insulating materials interposed and separated by other reflecting screens, and with at least one layer of temperature-homogenizing material in contact with the screen which is intended to be placed facing the heat source.

In one mode of embodiment, the conducting fibers forming the temperature-homogenizing material are carbon fibers which can be used up to a temperature of nearly 1200° C.

In one alternative embodiment, the conducting fibers are silicon carbide based, and the maximum temperature of use is greater than 1200° C.:

FIG. 6 depicts an especially advantageous use of a wall comprising at least one layer of temperature-homogenizing material.

The wall comprises, for example, a screen 1 made of a reflecting material, a layer 2 of temperature-homogenizing material and a layer 7 of conventional insulating material.

It is understood that the wall may be formed in any other way, in particular by a simple superimposition of layers of temperature-homogenizing materials or, again, that it can comprise layers of various materials which may or may not be separated by reflecting screens. The only necessary condition is that at least one layer of temperature-homogenizing material should be facing the heat source.

This wall is used to insulate two zones of a structure having a special shape.

More precisely, this structure comprises a barrier 8 with a non-planar or concave shape, exposed to the heat source or else taken to a high temperature.

The wall is interposed between the barrier 8 and a zone 9 of the part which it is necessary to keep at a low temperature.

The structure considered may be an aircraft wing or an aircraft fuselage in which the barrier 8 is a driving edge which, owing to friction, is taken to a high temperature. It may be, for example, a spacecraft in which the barrier 8 undergoes friction during re-entry into the atmosphere and is thus taken to an extremely high temperature. The zone 9 to be insulated may be a cabin or an area of a wing between the lower surface of the wing and its top surface. This area may thus comprise sensitive mechanisms such as fin control cables or rods, or else it may contain fuel.

More generally, the structure to be shielded comprises a barrier 8 with a non-planar shape and a zone 9, placed above this barrier, which has to be kept at a low temperature.

When the barrier 8 is taken to a high temperature, by direct contact with a heat source or by radiation or friction, this the barrier 8 transmits, to its side which is opposite to the heat source, a calorific radiation perpendicular to the side, depicted by arrows in the figure. These arrows show that at certain parts of the zone beyond the barrier 8, the re-transmitted radiation converges owing to the shape of the barrier 8 and there are, therefore, regions of the wall where the heat received is higher, especially the central regions 10, while the side regions have a lower temperature since the barrier 8 has a rounded, spherical or paraboloid shape.

By interposing this wall which comprises a temperature-homogenizing material, it is noted that the central region 10 of the surface of the wall that faces the heat source is instantaneously subjected to a higher temperature. However, owing to the presence of the layer 2 of temperature-homogenizing material, placed in the vicinity of this side of the wall, there is immediately a notable fall in the temperature as soon as the heat flux encounters the first elementary layer of this material.

There is therefore no longer any localized overheating in any part whatsoever of the wall. The use of an inslating wall according to the prior art would have made it necessary to reinforce the insulating power in its central region 10, in order to limit the transmission of substantial heat in this region. This would have entailed the use, in this region, of materials with a heat-insulating capacity which is greater than that of the material used in this invention, a method which would have resulted in additional weight and higher costs.

FIG. 7 considers the case where the wall fits a shape of the structure 8 to be insulated. The wall comprises, for example, a reflecting screen 1, a layer 2 of material which is conductive in one plane and retardant in the other, and a layer 7 of conventional insulating material. This arrangement can be used when the structure 8 to be insulated is not at a homogeneous temperature for, in this case, the wall placed in the immediate vicinity of the structure 8, opposite to the heat source in relation to the structure, is directly subjected to a non-homogeneous temperature and fulfils its homogenizing role. The structure 8 may also, as in the case of FIG. 6, be a single barrier interposed between a heat source and the wall.

What is claimed is:
1. A heat insulation wall comprising:
   (a) a first layer of reflecting material;
   (b) a second layer of heat conductive fibers each of which is at least approximately circular in cross-section, adjacent pairs of the fibers in said second layer being at least approximately parallel to one another and being in tangential linear contact with one another, said second layer having a first side in surface abutting contact with said first layer and a second side; and
   (c) a third layer of heat conductive fibers each of which is at least approximately circular in cross-section, adjacent pairs of the fibers in said third layer being at least approximately parallel to one another and being in tangential linear contact with one another, said third layer having a first side in surface abutting contact with the second layer and a second side;
   (d) said second and third layers being in surface abutting contact but being set at an angle to each other such that the fibers in the surface of said second layer facing said third layer make point contact with the fibers in the surface of said third layer facing said second layer, there being no resin or other bonding material between said second and third layers,
   (e) whereby said heat insulation wall conducts heat in directions parallel to said second and third layers and retards heat in directions perpendicular to said second and third layers.

2. A heat insulation wall as recited in claim 1 wherein said second and third layers are felted.

3. A heat insulation wall as recited in claim 1 wherein said second and third layers are one fiber thick.

4. A heat insulation wall as recited in claim 1 wherein the angle between the fibers in said second and third layers is at least approximately 90 degrees.

5. A heat insulation wall as recited in claim 1 wherein said fibers are carbon based.

6. A heat insulation wall as recited in claim 1 wherein said fibers are silicon carbide based.

7. A heat insulation wall as recited in claim 1 wherein said first layer is formed of a material selected from the group consisting of gold, platinum, paladium, and beryllium.

* * * * *